(No Model.)
N. W. STOWELL.
MOLD FOR MANUFACTURING CEMENT PIPE.
No. 263,736. Patented Sept. 5, 1882.
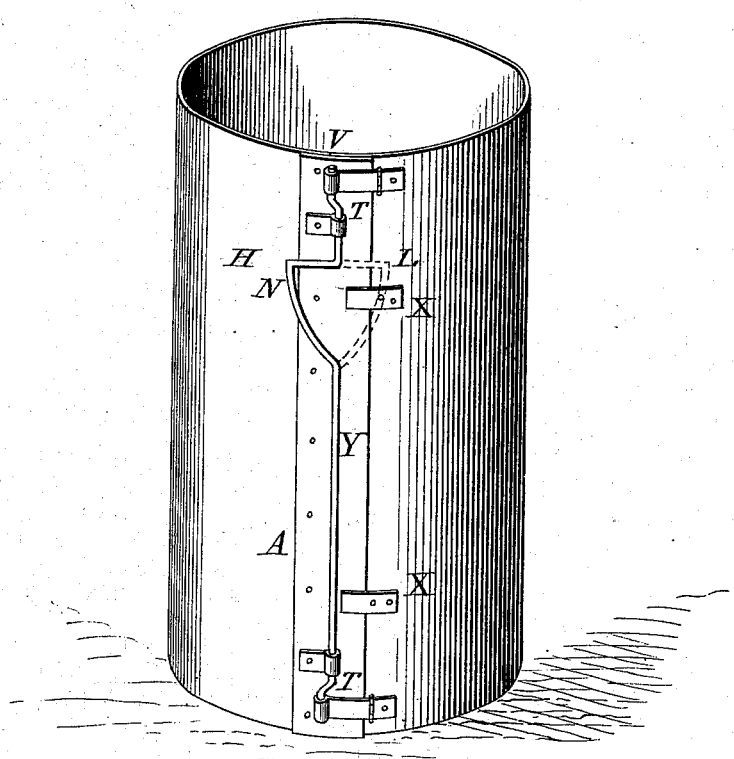
Witnesses:
Daniel Breed
Wm. C. McGill.
Inventor:
Nathan W. Stowell
By Edwo. J. Underwood
attorney

UNITED STATES PATENT OFFICE.

NATHAN W. STOWELL, OF LOS ANGELES, CALIFORNIA.

MOLD FOR MANUFACTURING CEMENT PIPE.

SPECIFICATION forming part of Letters Patent No. 263,736, dated September 5, 1882.

Application filed February 2, 1882. (No model.)

*To all whom it may concern:*

Be it known that I, NATHAN W. STOWELL, of Los Angeles, State of California, have invented a Mold for Manufacturing Cement Pipe, of which the following is a specification.

The object of the invention is to form a mold for the manufacture of pipe, which shall be complete in itself and require no additional tools or levers with which to expand the cases, nor anchors to hold the fastenings from working loose during the molding of the pipe. This I claim to have accomplished in the mold herein described, and refer to the accompanying drawing, which is a part of this specification.

In the figure of the drawing, H is an elastic case, on which is fastened the plate A, covering the loose joint V, the rod Y and cranks T T, so connected with the case H that when the handle N is moved to the position shown by the dotted lines L the case is expanded, opening at V beneath the plate A. X X are clamps or guides holding the free edge of the plate A close to the case. For a core, reverse the position and place the fastenings and plate on the inside of the cylinder.

By making the cranks pass the centers when in position for use they are never jarred loose or open in molding, and the case can always be easily opened without the use of a hammer or additional lever.

I claim—

1. In a mold for manufacturing cement pipe, the combination of the cylindrical case H, having a longitudinal joint, V, extending its entire length, covered by the plate or apron A, securely attached to the case at one side of the joint, and extending across and covering the said joint, provided with the double-lever rod Y and its attachments, for the purpose of opening and closing said joint, all substantially as described.

2. The combination, in a mold for manufacturing cement and similar pipes, of the elastic case H, having a longitudinal opening extending its entire length, the double-lever rod Y, having cranks T and handle L, the plate or apron A, covering the opening in the case, and the guides X for the purpose of holding the free edge of the plate or apron against the case, all as hereinbefore shown and described.

NATHAN W. STOWELL.

Witnesses:
G. A. DOBINSON,
T. E. ROWAN.